(12) United States Patent
Glore, Jr.

(10) Patent No.: US 10,990,983 B2
(45) Date of Patent: Apr. 27, 2021

(54) MANAGING INTERNET ADVERTISING AND PROMOTIONAL CONTENT

(71) Applicant: Keep Holdings, Inc., New York, NY (US)

(72) Inventor: E. Byron Glore, Jr., Los Angeles, CA (US)

(73) Assignee: Keep Holdings, Inc., New York, NY (US)

( * ) Notice: Subject to any disclaimer, the term of this patent is extended or adjusted under 35 U.S.C. 154(b) by 184 days.

(21) Appl. No.: 15/864,519

(22) Filed: Jan. 8, 2018

(65) Prior Publication Data

US 2018/0197184 A1    Jul. 12, 2018

Related U.S. Application Data

(63) Continuation of application No. 12/576,187, filed on Oct. 8, 2009, now Pat. No. 9,875,477.

(60) Provisional application No. 61/103,896, filed on Oct. 8, 2008.

(51) Int. Cl.
| | |
|---|---|
| *G06Q 30/00* | (2012.01) |
| *G06Q 30/02* | (2012.01) |
| *G06Q 10/00* | (2012.01) |
| *G06Q 50/00* | (2012.01) |

(52) U.S. Cl.
CPC ............ *G06Q 30/00* (2013.01); *G06Q 10/00* (2013.01); *G06Q 30/0217* (2013.01); *G06Q 30/0239* (2013.01); *G06Q 30/0245* (2013.01); *G06Q 30/0273* (2013.01); *G06Q 30/0276* (2013.01); *G06Q 30/0277* (2013.01); *G06Q 50/01* (2013.01)

(58) Field of Classification Search
CPC .................................. G06Q 30/0207–30/0277
USPC ................................................... 705/14, 319
See application file for complete search history.

(56) References Cited

U.S. PATENT DOCUMENTS

| | | | | |
|---|---|---|---|---|
| 7,756,744 B2* | 7/2010 | Schiff | ................ | G06Q 30/0253 705/14.55 |
| 8,037,093 B2* | 10/2011 | Tiu, Jr. | .................. | G06F 16/258 707/781 |

(Continued)

OTHER PUBLICATIONS

W3Schools, HTML Images webpage, https://www.w3schools.com/html/html_images.asp, Aug. 30, 20015 (Year: 2005).*

(Continued)

*Primary Examiner* — Luis A Brown
*Assistant Examiner* — Richard Reinhardt
(74) *Attorney, Agent, or Firm* — Fenwick & West LLP

(57) ABSTRACT

Methods, systems and articles having machine-readable instructions can be implemented to manage advertising content using a computing device, for example, by retrieving a page of content from a network, the retrieved page including at least some advertising content, presenting the retrieved page of content to the user of the computing device, receiving user input via a user interface identifying at least a portion of the presented advertising content to be saved, saving the identified portion of advertising content, receiving user input via the user interface identifying some or all of the saved advertising content to share with another user, and causing the identified saved advertising content to be shared with the other user.

17 Claims, 9 Drawing Sheets

(56) References Cited

U.S. PATENT DOCUMENTS

| | | | | |
|---|---|---|---|---|
| 2007/0067798 | A1* | 3/2007 | Wroblewski | H04N 21/482 725/37 |
| 2007/0083468 | A1* | 4/2007 | Wetherell | G06F 16/958 705/51 |
| 2007/0100653 | A1 | 5/2007 | Ramer et al. | |
| 2007/0106557 | A1* | 5/2007 | Varghese | G06Q 30/0219 705/14.19 |
| 2007/0136657 | A1 | 6/2007 | Blumenthal et al. | |
| 2008/0046976 | A1* | 2/2008 | Zuckerberg | H04L 63/102 726/4 |
| 2009/0327251 | A1* | 12/2009 | Walmer | G06Q 30/02 |
| 2010/0205179 | A1* | 8/2010 | Carson | G06F 16/27 707/740 |

OTHER PUBLICATIONS

Centre for Educational Development, "A Guide to Using Delicious," Jul. 2009, pp. 1-14.

Dréze, X. et al., "Internet Advertising: Is Anybody Watching?," Journal of Interactive Marketing, vol. 17, No. 4, Sep. 2003, pp. 8-23.

Kazienko, P. et al., "Personalized Web Advertising Method," AH 2004: Adaptive Hypermedia and Adaptive Web-Based Systems, Aug. 2004, pp. 146-155.

Krammer, V., "An Effective Defense against Intrusive Web Advertising," 2008 Sixth Annual Conference on Privacy, Security and Trust, Oct. 2008, pp. 1-12.

Langheinrich, M. et al., "Unintrusive customization techniques for Web advertising," Elsevier Science B.V., May 1999, pp. 181-194.

Lekakos, G. et al., "An Integrated Approach to Interactive and Personalized TV Advertising," Proceedings of the 2001 Workshop on Personalization in Future TV, Jul. 2001, pp. 1-10.

Lekakos, G. et al., "Delivering Personalized Advertisements in Digital Television: A Methodology and Empirical Evaluation," Jan. 2002, pp. 1-11.

Perez, L., "Social Bookmarking with Delicious," Aug. 22, 2008, pp. 1-7.

United States Office Action, U.S. Appl. No. 15/851,230, dated Oct. 4, 2019, 14 pages.

* cited by examiner

MANAGING INTERNET ADVERTISING AND PROMOTIONAL CONTENT

CROSS-REFERENCE TO RELATED APPLICATIONS

This application is a continuation of U.S. application Ser. No. 12/576,187, entitled "Managing Internet Advertising and Promotional Content," filed Oct. 8, 2009, which claims benefit of U.S. Provisional Application Ser. No. 61/103,896 filed on Oct. 8, 2008, the entire contents of which are incorporated herein by reference.

BACKGROUND

This document generally describes systems and techniques for managing Internet advertising and promotional content, for example, by using a browser plug-in and ad management system to facilitate automatic tagging, saving, storing, retrieving, serving, and sharing Internet advertising and promotional content from any or all Internet-enabled devices in a secure environment.

Advertising is a critical tool of the free market economies of the world. It is the most important force in the consumer purchasing cycle. Advertising is the marketing tool that delivers communication messages to educate and motivate consumers to purchase goods and services at on line and off line retail outlets. Billions of dollars are spent annually buying and selling advertising. Advertising is the lifeline of the Gross Domestic Product generation of every free market consuming country in the world.

Internet advertising dollars purchased by advertisers, ad media buyers and ad serving networks on the World Wide Web is exploding in terms of growth. Billions of Internet users are searching for specific information and many are consuming entertainment content and socializing and sharing by connecting with users through the different social and business networks. Research indicates Internet users hate pop-up advertisements and are cautious about clicking on all Internet advertisements unless they are using the Internet for searching for product and brand information or see compelling advertisements about products they are interested in. Even when the advertisements are customized and delivered directly to consumers based on their behavior profile, most users don't click on advertising and promotional links due to their personal time constraints, that they find nothing compelling or interesting about the advertisement, and/or spam and privacy concerns.

SUMMARY

This document describes processes and systems for managing Internet advertising and promotional content, for example, by using a browser plug-in and ad management system to facilitate automatic tagging, saving, storing, retrieving, serving, sharing and/or securing Internet advertising and promotional content for any or all Internet-enabled devices In one implementation, a software application, which can be in the form of a stand alone program, widget, browser plug-in or web site user interface, embodies a method and system to quickly snag, save, store, serve, retrieve, and/or share text, banner, audio and video advertising or promotional messages and their related content in a safe, secure, and private manner using all Internet-enabled devices and platforms connected to the Internet. Users can access their saved, stored, and secured information on demand from any place in the world with their Internet enabled device. The software application offers an authentication and security method to ensure privacy protection using Internet encryption methodologies for incoming and outgoing Internet communications. Implementations may include one or more of the following features:

Using mechanisms disclosed here, for example, a browser plug-in, may provide the capability of snagging for later consumption of many types of advertising or promotional content from website pages, mobile phones, personal digital assistants, game consoles, and televisions which are connected to the Internet and capable of displaying advertising and related promotional content, such as discount coupons, text, banner and video advertisements, including Flash, JPG, PNG, GIF, and other common graphics formats using the browser plug-in on the advertisement or promotional content.

After snagging the advertising or promotional content, the user of the browser plug-in may save and store the advertising link and the text, banner, video or other promotional type content type back to a data storage server. A data storage server will support very large files and have bandwidth throttling.

Data storage server software uses a secure HTTP (Hypertext Transfer Protocol) or other Internet protocol for requests to the ad management system from a user of the browser plug-in installed on the Internet enabled device, and sends responses from the ad management system back to the Internet enabled device using a secure HTTP or other Internet protocol, over the Internet. All save and storage requests for advertisement and promotional content, initiated by members, contains additional data information including request date and time (time stamped), member identity ("ID"), and information to uniquely identify the content and content publisher. Users will be alerted when new content they have snagged, saved, and stored to the ad management system using the browser plug-in has arrived.

The browser plug-in and ad management system have methods or instructions that automate the saving and storage of content on the storage server and instructions are for collecting, logging and cross referencing all advertisement and promotional content stored on the system server with additional information that may be received from information providers and other users of the browser plug-in and ad management system.

After storage or linking of the advertising or promotional content to the user, the user can interact with the saved and stored content in a variety of ways, including viewing and sharing it with other users or friends, as well as use the content as originally designed by the content creator. The ad management system may allow the user to request additional information about the product, service, or promotion item described by the advertisement or promotional content from the content creator, agent, or distributor.

The ad management system may have methods for creating a community feature area to allow users to share advertisement, product, and services information, experiences, and opinions through forums or message boards and live group and private chats. The ad management system methods also may include a news and announcement area for special postings or notifications by the ad management system regarding new products or services, discount coupons, or other special promotions.

The ad management system may include methods for user participation in reward generating activities such as Focus Groups, Surveys, and special opinion polls. These activities are advertiser or manufacturer sponsored and rewards may include redeemable points, cash, discounts or other promotional prizes.

Implementations of the disclosed browser plug-in and ad management system may allow a user to snag, save, collect, store, and retrieve text, banner, video, audio, coupon, and other advertisement or promotional content from pages on the World Wide Web, or other Internet connected platform, and automatically and upon request receive additional information about each individual ad saved and users can share their my ad valet information and personal comments with friends.

In an implementation of the browser plug-in and ad management system, any user with an Internet enabled device, such as a desktop or laptop computer, PDA (personal digital assistant), television, game console, or mobile device to snag or grab textual and digital advertising content, including text advertising links, online banners, and other promotional content, as well as embedded static, video, or mobile advertising for the purpose of saving, storing, and accumulation these time-stamped advertisements for later review without interruption to the users current activity or online session.

Another aspect of the disclosed ad management system is a network system of storage management, categorization management, and online retrieval and display of a user's collected advertising and promotional content. The browser plug-in and ad management system is a membership driven and has many implementations to enable a member to communicate with the network ad management system.

According an aspect of the disclosed ad management system, the automatic retrieval of additional advertiser and product information associated with a product or service represented by a saved advertisement is linked to the users profile once at the time of a user ad storage request. Users can then visit the online system network at any time from a Internet enabled device capable of displaying Internet content to manage the promotional and discount content collected. The network of the ad management system may, in the information automatically retrieved in response to a members ad content capture, save, and store, include comparison of similar products or services, by either same or like brands, product price comparison, and special promotions, sweepstakes, and price or discount promotions by the advertiser associated with a member saved ad or promotional content.

Another implementation of the ad management system is the creation of an online private safe-zone within the network using a user membership profile in which to review all new and past saved advertisements and associated auto-generated product information for the purpose of evaluating further interaction with the advertisement in a safe privacy oriented environment whereby the network of the disclosed ad management system performs as a interface between the advertiser's website and the member user.

The disclosed ad management system will assist the user in requesting additional advertisement or product information directly from the advertising source and facilitate the delivery of responses to requested information to a user in a private space within the network. This allows the user to privately communicate electronically with advertisers using the network of the ad management system to originate and receive all inbound and outbound correspondence.

The ad management system may include an ad and product related Community Feature area within the secure network of the ad management system allowing members to use a message board or forum to post product or advertisement opinions and information, chat online with other currently active members, and privately send or forward ad or product information to other members or users for the purpose of sharing said information.

The ad management system also may contain a Cash For My Opinions area within the network allowing users to earn cash, discounts, trade-able points or alternate currency for user participation in online product or advertising polls, product surveys, focus groups, and product or ad evaluations. The ad management system can use demographics, brand, and behavioral statistics to target users for participation in particular polls, surveys, or product review. Sponsorship of activities related to the Cash for My Opinions may occur through direct advertiser or third partner agent involvement or controlled by the ad management system.

Methods, systems and articles having machine-readable instructions can be implemented to manage advertising content using a computing device, for example, by retrieving a page of content from a network, the retrieved page including at least some advertising content, presenting the retrieved page of content to the user of the computing device, receiving user input via a user interface identifying at least a portion of the presented advertising content to be saved, saving the identified portion of advertising content, receiving user input via the user interface identifying some or all of the saved advertising content to share with another user, and causing the identified saved advertising content to be shared with the other user.

The advertising content can include one or more of text, banner, audio and video advertising or promotional messages or discount coupons.

The user interface can be implemented as a standalone program, a widget, a browser plug or website user interface.

One or more of authentication, security and encryption processes can be provided to ensure privacy to the user.

The computing device on which managing advertising content is performed can include one or more of a mobile wireless device, a cell phone, a personal digital assistant, a game console and a television set.

Saving the identified portion of advertising content can include transmitting the identified portion of advertising content to a remote server for storage. The computing device can communicate with the remote server using a Hypertext Transfer Protocol (HTTP).

Saving the identified portion of advertising content can include saving additional information along with the saved advertising content, the additional information comprising one or both of a member identification and a corresponding time stamp.

Saving the identified portion of advertising content can include saving additional information along with the saved advertising content, the additional information including a unique identifier to identify one or both of the content and the content publisher.

The user can be alerted when additional information relating to at least a portion of the saved advertising content becomes available.

Additional content received from a content provider relating to at least a portion of the user's saved advertising content can be saved automatically. The user's saved advertising content can be cross-referenced with the additional content received from the content provider.

The computing device can enable the user to manipulate the saved advertising content, for example, by one or more of viewing, editing, sharing, deleting, or copying the saved advertising content.

Input can be received from the user via the user interface requesting additional information about at least a portion of the user's saved advertising content. Communication with a remote server can occur to obtain the requested additional information and the obtained additional information can be presented to the user.

User interface mechanisms can be provided that enable the user to interact with other users in a community area.

The computing device can enable the user to interact with other users by sharing information relating to one or more of advertising content, product information, service information, user experiences and user opinions.

The community area can provide access to one or more of forums, product announcements, message boards, news areas, discount coupons, special promotions, and user chat tools.

User interface mechanisms can be provided relating to reward generating activities, for example, one or more of focus groups, surveys, and opinion polls. The reward generating activities can be sponsored by an advertiser or a manufacturer. Available awards can include redeemable points, cash, discounts or promotional prizes.

The subject matter described in this document can provide a number of other potential advantages. For example, the browser plug-in and system described here enables consumers to tag, save, store, serve, retrieve, and share in a secure environment Internet text, banner, audio and video advertising and promotional messages and along with user generated content using all Internet enabled devices.

Further, by using this browser plug-in and ad management system users can quickly tag, save, store, serve, retrieve, share in a secure environment all Internet text, banner, audio and video advertising and promotional messages and user generated content using all Internet enabled devices. Users can access their personal storage server information on demand from any place in the world with an Internet connection.

Other potential benefits to advertisers from the browser plug-in ad saving method and the ad management system may include one or more of the following:

Higher advertising click through rates by web page visitors

Increased Optimization and higher return-on-investment (ROI) on advertising dollars invested in all respective Internet platform media buys that are embedded on WWW pages Advertising partners can connect organically with users of browser plug-in ad saving method and ad management system, and provide additional product/brand information and where to purchase products/brands and services.

Users can elect to share private information about likes and dislikes of ads and products with advertisers Other potential benefits to end users from the browser plug-in ad saving method and ad management system may include one or more of the following:

Ability to save Ads
Time Shift Clicking on Ads
Save Time
Make Money

Details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
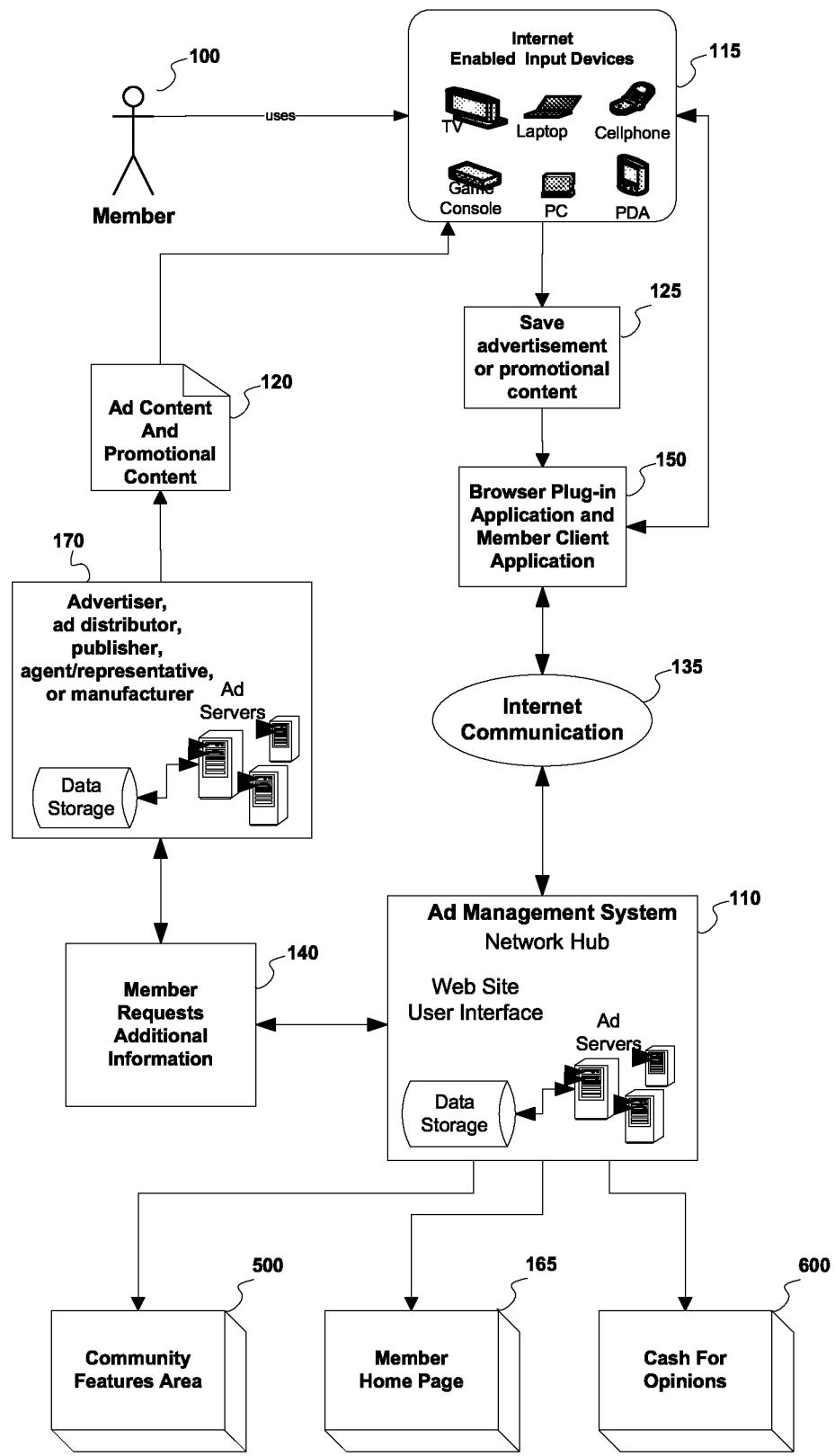
FIG. 1 shows an overview of a browser plug-in and ad management system.

As shown in FIG. 1, a member with an Internet capable device, such as a personal computer or laptop, mobile phone, television, game console, or PDA as shown in block 115 and having a method or means capable of communicating and connecting to the Internet 135, and having access to, the ability to view, display, or otherwise interact with delivered advertising content 120, may use the technology of the current browser plug-in to selectively choose banner, text, video and static advertising, coupons, or other promotional content 120 and their related content for the purpose of saving, storing, retrieving or otherwise clicking on and interacting with the advertising content at a later and more convenient time. The ad management system is comprised of an Internet website and system network infrastructure that includes computer storage servers, computer memory, communication hardware and software, a publicly accessible web server, user interface, and other hardware and software necessary to implement and support a computer system capable of allowing the saving, storing, securing, viewing, and interaction with all types of advertisement, and promotional contents. The ad management system will also be called the "network hub" 110 for the purposes of describing, within this document, all system communication, Internet user interface interaction, actions, and system network infrastructure including computer storage, internal and external network communication, web server, software, and hardware necessary to implement and support a computer system in support of the browser plug-in and ad management system.

Figure 2:
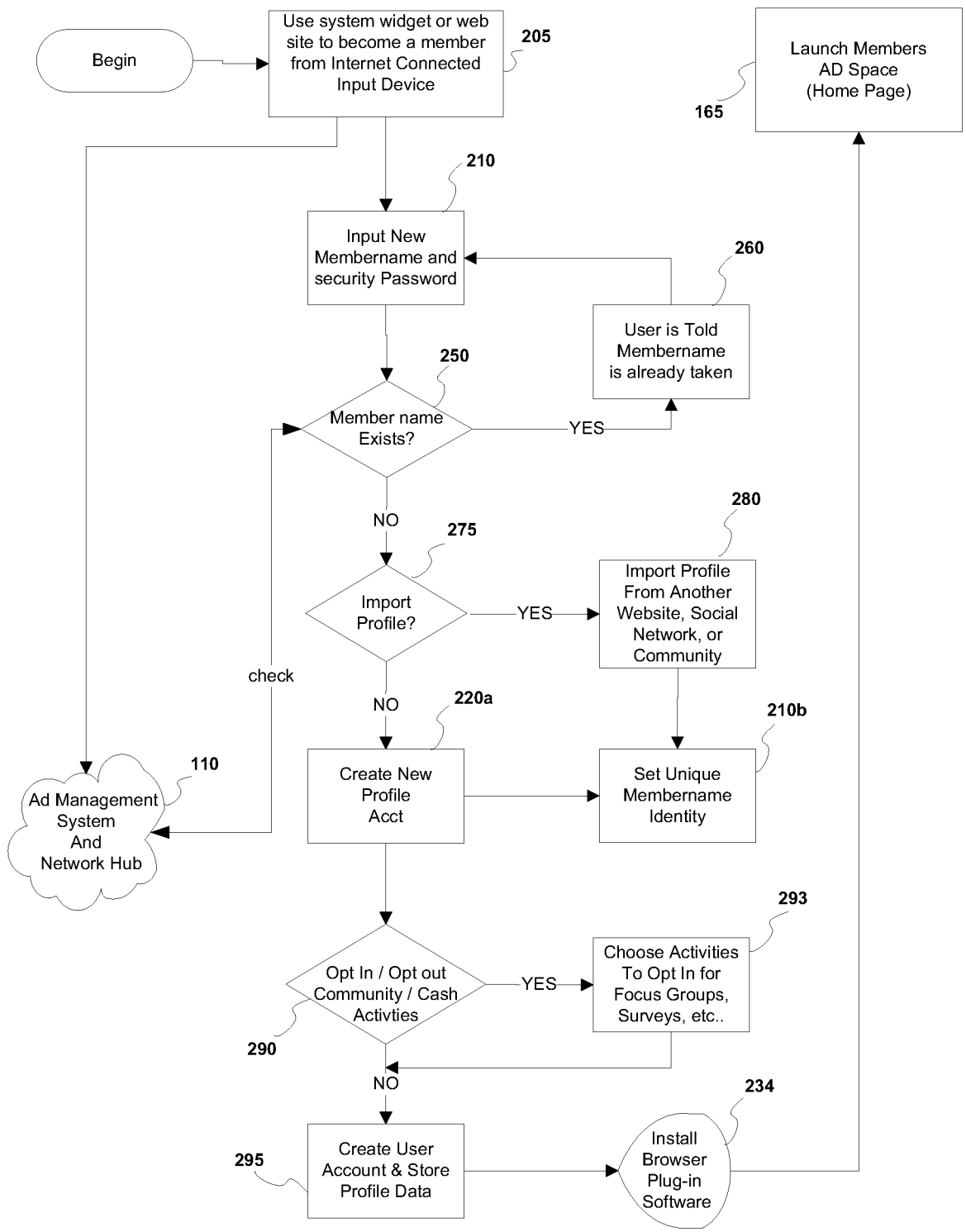
FIG. 2 illustrates an exemplary process of becoming a member of a system network.

As illustrated in FIG. 2, which depicts an exemplary process of becoming a member of a system network, usage of the various implementations of the browser plug-in and ad management system can require a user membership. The browser plug-in and ad management system, provides several ways to create membership to the browser plug-in and ad management system. Prospective members with a Internet connected device capable of displaying web content, may use the web user interface and URL of the ad management system, a software widget on a third party web site, or download the browser plug-in client app 150 to create a unique member name 210 and secure password 210 to request membership to the browser plug-in and ad management system. Processing of a membership request will verify the uniqueness 250 of the requested member name 210 within the network hub 110. If the requested member name 210 is not available at the time of the membership request, a notification message in step 260 is displayed to the prospective member advising that the name in step 210 is already taken and that another member name 210 should be chosen and the membership request can be re-submitted. After a unique member name and valid password is chosen, implementations of the browser plug-in and allow for the import of member profiles in step 280 from another web site, such as a social network like Facebook, or My Space, to allow the easy creation of such member profiles.

In implementations of the browser plug-in and ad management system, software widgets, or other software programs located on third party web sites may be used to invite friends, family, or others to become members.

Member profiles may contain member personal information such as demographics, age, gender, location, hobbies, habits, as well as member preferences and other information to identify the member's likes, dislikes, or other behaviors.

Various implementations of the ad management system, for the purposes of providing a means to create or import membership profiles 280, may include software application widgets or programs 205 residing on third party websites or platforms that have a communication means with the network hub 110.

This member name 210 will be used within the ad management system to create a unique link between a member and their private and secure area home page or ad space 165 inside the network hub 110.

These links are created for saving, storing, retrieving, interacting, and categorization of all of the advertisement and promotional contents 120 sent to and received by the network hub 110 by way of a member save and storage request.

Figure 3:
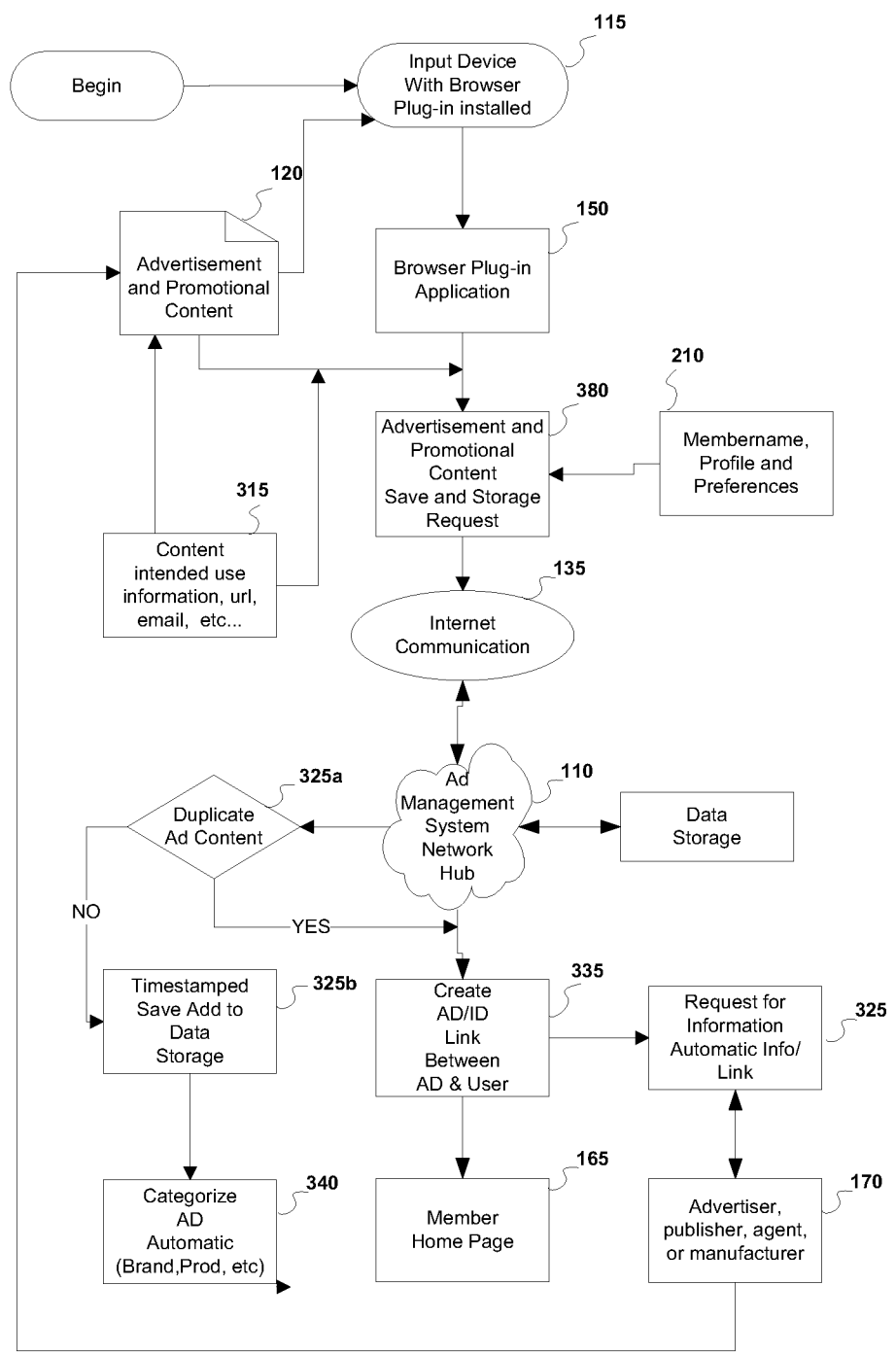
FIG. 3 illustrates typical steps in saving, storing and securing an advertisement or promotional content.

FIG. 3 illustrates typical steps in saving, storing and securing an advertisement or promotional content. A browser plug-in client software application 150, installable on an Internet enabled device, considered to be the "collector module" that allows for the member to save, store, and secure 380 member selected advertisement and promotional content 120 in the network hub 110. The browser plug-in implements methods to capture, save, and store a member selected advertisement or promotional content.

The browser plug-in must be installed and configured on the Internet-enabled input device by the member before a member can be allowed to capture, save and store any content. Internet-enabled input devices include devices such as a Personal Computer, Mobile Phone, Game Console, Web TV, and PDA, The input device contains a pointing method or apparatus, such as computer mouse cursor capable of interacting with web page hyperlinks. The web page hyperlink does include text and graphic advertisements or promotional content. Web page hyperlinks may include advertisements and promotional content embedded in Adobe Flash, Microsoft Silverlight, or other animation or video creation software applications. The installed browser plug-in, in one implementation, does display an icon, in response to the device user's using such a pointing method or apparatus to hover over a hyperlink. The graphic icon is displayed next to the pointing method or apparatus, such as a computer mouse cursor. The icon is displayed for a finite length of time and will disappear upon expiration of this predetermined time.

A member may click or select the displayed icon, while hovering over a hyperlink, to request the browser plug-in to capture, save, and store the selected advertisement or promotional content. The request will sent in a communication packet from the browser plug-in to the ad management system for processing.

In another implementation of the browser plug-in, the browser plug-in does display an icon, in response to the device user's using such a pointing method or apparatus to hover over a hyperlink, to signify the member's ability to capture, save, and store the hyperlink. In this implementation of the browser plug-in, when the member, after clicking or selecting the hyperlink, shall be forwarded to the landing or target page designated by hyperlink, where upon a right click on an un-occupied space of the target or landing page, using a pointing method or apparatus, such as a computer mouse cursor, will display a menu with an menu item or option installed to allow the member to capture, save, and store the advertisement or promotional content represented by the clicked on hyperlink, and return to the display page for which the hyperlink was originally embedded.

According to implementations of the browser plug-in and ad management system, all advertisement and promotional content 120 received and stored by the ad management system and network hub 110 shall be categorized 340 by product category type, brand, manufacturer, and associated product keywords and will be uniquely time-stamped 325b and a connection made to the member 295 account of the member who initiated the advertisement and promotional contents 120 save and storage request. In operation, the ad management system, which creates a system generated identifier for each unique advertisement or promotional content 120, upon the initial member request 380 for save and storage, the ad management system may in fact already have an existing stored version of the advertisement or promotional content 120, and may in fact create an association 335 between the existing advertisement or promotional content 120 and the id of the member who initiated the save and storage request 380. A unique identifier for the advertisement or promotional content is created by the ad management system based upon the publishing entity or origin of the advertisement or promotional content 120. The ad management system will also use the publishing source and advertisement or promotional content 120 information, to verify the uniqueness of the advertisement or promotional content 120 within the ad management system to help eliminate storage duplication 325a inside the network hub 110.

The information about the advertisement and promotional contents 120 sent to the network hub 110 from the Internet enabled device used to request the save and storage of all advertisement and promotional contents 120 may include, but not limited to, any visual file, such as a JPG, GIF, or PNG for a banner ad or text for a textual ad, and video for video ad audio file, or other property of the advertisement and promotional content 120 content, such as the Internet URL or web landing page, telephone number, email, direct connection or other communication means or embedded method intended to allow the member to interact with the advertisement and promotional content 120 content as intended by the originator of the advertisement and promotional content 120.

In another implementation of the ad management system, once the system has saved, stored, and categorized the advertisement and promotional content 120, the network hub 110 will automatically initiate a request 325 for additional product information 140 from the originator of the advertisers, ad distributors, publishers, agent/representatives, manufacturers, or service providers 170, relevant to the product or service content and intent of the advertisement or promotional content 120.

This additional information 140 may include price promotions, coupons, sweepstakes, expiration dates, and product comparison information. After this automatically requested information 325 is received by the network hub 110, the information 140 is linked with or embedded in the stored advertisement or promotional content 120 stored within the network hub 110. This "valet service" of automatically retrieving additional product or service information at the time an advertisement or promotion content 120 is saved and stored 325b allows the member to better evaluate the value or usefulness of the product or service represented by the advertisement when interacting or viewing the advertisement or promotional content 120 within the privacy of the ad management system.

Figure 4:
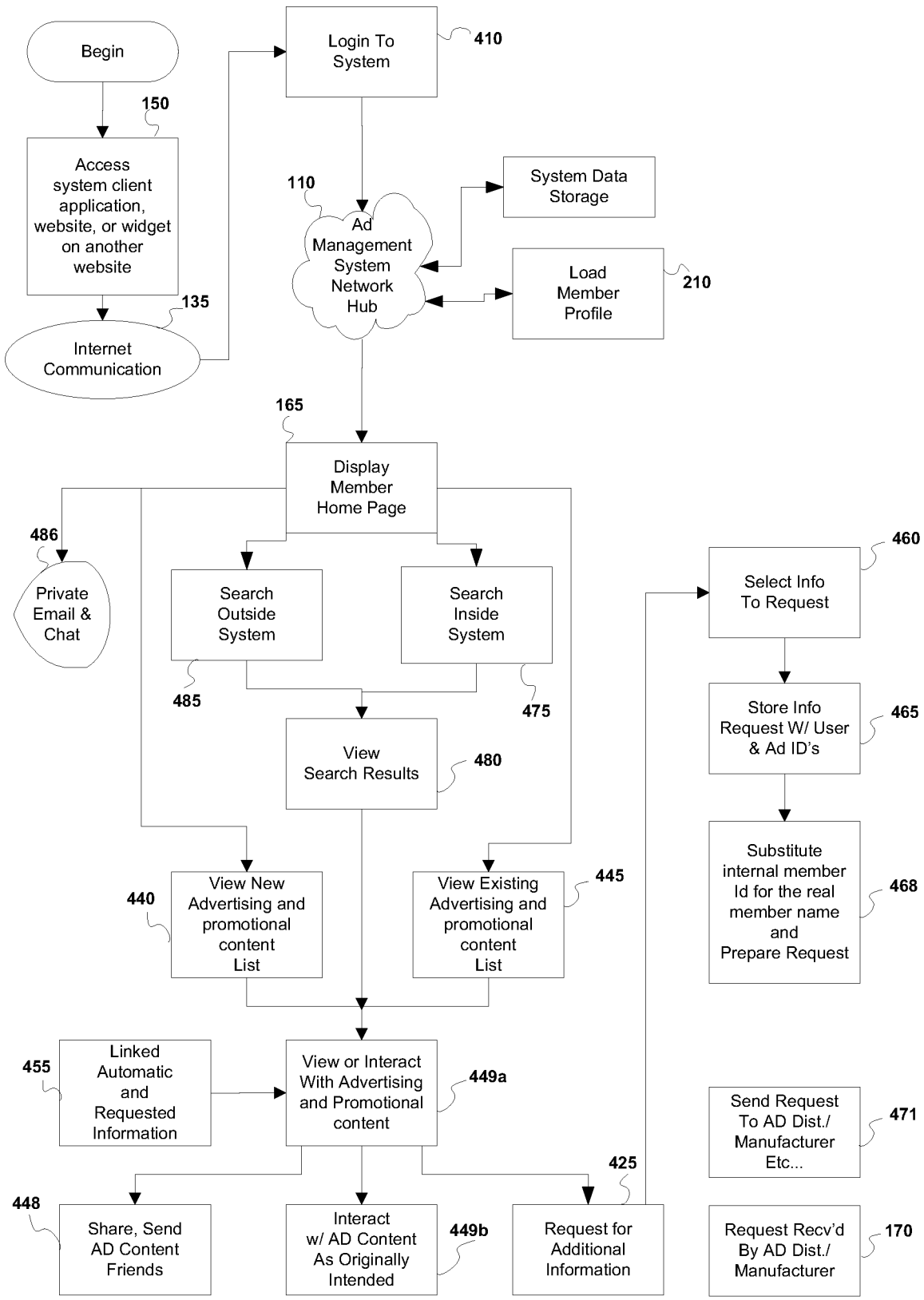
FIG. 4 is a diagram illustrating different interactions with saved and stored advertisements.

FIG. 4 is a diagram illustrating different interactions with saved and stored advertisements, for example, reviewing ads and requesting information. The ad management system includes an implementation within the network hub 110 that includes a secure and safe web site with an easy to use, friendly, and intuitive user interface 110 as shown in FIG. 4. Various implementations of the ad management system support the implementation of a user interface 110 that allows members to have multiple choices with which to access the web site or network of the ad management system. All user interface implementations providing access 410 to the computer network of the ad management system 110, which requires the member to have an input device 115 capable of Internet communication 135, may include a software 150 widget, existing on a third party web site, a device dependent software application, or simple Internet browser with access to the web site specific URL (Universal Resource Locator) for the network hub 110.

Once a member starts an implementation of the user interface of the ad management system and logs on 410 to access the network hub 110, the member is presented with a customized homepage 165 where the member can view, delete, share, or otherwise interact with their saved and stored advertisements and promotional contents 120 or other implementations of the ad management system in a private, secure, and safe environment. The members landing or home page 165 inside the ad management system represents an launch point into the members private "ad space" area 165 and may be customized using a variety of information including member preferences and member profile information such as personal information, product or service interest, demographics, email contact, and member behavioral information.

Inside a member's private area or "ad space" 165 in the network hub 110, members may interact with new stored advertisements and promotional content 120, linked to the member through a save and storage request received by implementation of the ad management system. This interaction with save and stored advertisements and promotional contents 120 includes a display list 440 of newly saved advertisements and promotional contents 120, a display list 445 of previously saved and stored advertisements and promotional content 120. Any available additional information 455 received by the network hub 110 in response to an automatic or member initiated request from an advertiser, manufacturer, publisher, or distributor 170 of the advertisement or promotional content 120 is linked and displayed along with the corresponding content. The display of saved and stored content may be sorted by date saved, category, and content format type such as video, textual, or banner. The sorting implementation of these displays also allows the member to group together advertisements or promotional contents 120 to easily locate previously viewed content. For example, members may create a grouping for clothing, electronics, or to group discount coupons together. Implementations of the ad management system may allow the member to have options for interacting with saved and stored advertisements and promotional contents 120 above and beyond the scope and intent 449a and 449b of the advertisers, manufacturers, publishers, or distributors 170. The user interface of the ad management system includes implementations that allow for the member to interact or interface with their saved and stored advertisement or promotional content 120 anonymously through their Internet connected device. This essentially shields the members' true identity while accessing Internet related content using the ad management system. Implementations of the ad management system allow for the member, while viewing or interacting with an advertisement or promotional contents 120, to create and attach a "note pad" to any advertisement or promotional contents 120 saved and stored inside of the network hub 110. This "note pad" can be used by the member to keep notes and other information about the associated content. Notes are date and time-stamped for member convenience.

An implementation of the ad management system allows members to share 448 their stored advertising and promotional content with other members, friends, buddies, and associates inside and outside the network hub 110.

When members share 448 any advertising and promotional content and related information 120, either partially or in it's entirety with another known member, or group of the ad management system, these ads would become available in the destination home page(s) 165 of the intended member or group. This content is then available to be interacted with, as if the recipient or intended member had personally made the save and storage request to the ad management system.

For member sharing 448 outside of the network hub 110, the email communication to the intended person(s) will be made directly from the network hub 110 on behalf of the member. The member name will be included in the text of the email or other communication text, but all member information will remain private, and the sender's information will remain anonymous.

In addition to the information automatically requested by the network hub 110 as triggered by the save and storage request 380 of an advertisement or promotional content 120 to ad management system, a member of the ad management system may, if desired, initiate a request 425 for more information from a stored advertisement or promotional content's 120 publisher, manufacturer or distributor 170. The requested information may include product or service purchase locations, warranty information, and product or service support information. FIG. 4 shows a typical example of a member request for additional information in which a member in step 425 initiates the request, the member then in step 460 makes selection(s) of information requests from a list of available options. In step 465, the network hub 110, stores the information request with unique resource identifier linking the information request with the member's account, the saved and stored advertisement or promotional content, and the date and time of the request. To maintain member security and privacy in step 468, the network hub 110, will substitute its own internal unique identifier for any member specific identification information sent in the request. Step 468, is central to the processing of information requests, as it provides total privacy for the member, and prevents member tracking or spamming as is possible by members making informational requests from outside of the network hub 110. In step 471, the network hub 110 sends the request to the advertisers, ad distributors, publishers, agent/representatives, manufacturers, or service providers 170 for processing. Once a response to the requested information is received by the network hub 110, the unique request id is used to ensure that the member is notified, by member alert, or other communication means that new information is available.

When obtainable, either through a third party, the network hub 110, or a collection of member or member generated reviews, brand and manufacturer ratings and recommendations might also be requested by a member.

In an implementation of the disclosed ad management system, within the privacy and security of a member's "ad space" or personal area 165, a member may in step 475 perform a search of the network hub 110 for product rating, brand, discount coupon, or other advertisement information inside of the ad management system and view or interact with the results in step 480. Members, in step 485 may also anonymously perform a search of the World Wide Web for information safely and securely from inside the ad management system.

Figure 5:
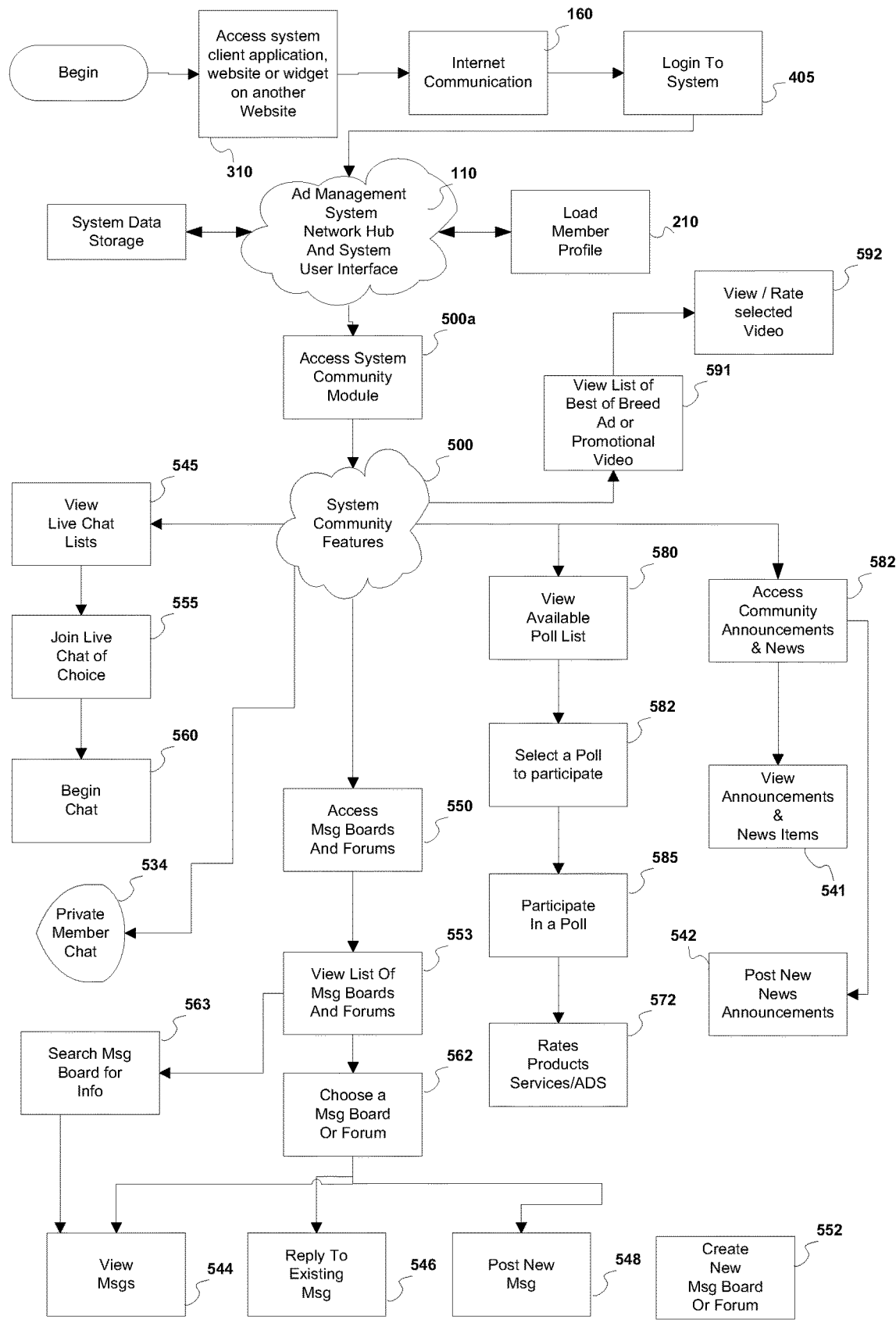
FIG. 5 illustrates aspects of Community Features.

FIG. 5 illustrates various aspects of Community Features. Among the various implementations of the ad management system, are software application modules that are accessible from a members homepage that presents a user interfaces for Community Features 500. The Community Features, provided by a method of the ad management system, allow members to communicate or otherwise share advertisement, product, brand, manufacturer, or services information with other members of the ad management system. Members using the Community Features may perhaps participate in live online chat conversations 555 with other members, or participate in a poll 582, or access one the forums or message boards 550 that are available.

In an example of the live chat implementations, there could be many live chats occurring simultaneously in real-time within the Community Features 500 of the ad management system, a member may in step 545 view a listing of all currently available live chats to determine if a particular chat topic or subject matter is of interest to them for the purpose of participating in the chat. Once a live chat has been selected, the member can join the live chat in step 555 and begins chatting with other members in step 560. In an implementation of the ad management system, members may also initiate private and secure online chat sessions 534 or messaging with other members or member customized lists of members of the ad management system. These member created lists of members of the ad management system can be used to create small communities of users with like product, brand, advertisement or other like interests.

In the various message board or forum implementations of the ad management system represented by step 550, message boards or forums exist for members to post, view, and share advertisement, special promotion, product, or service information and experiences as well as to request advertisement, product information, opinions, and experiences from other members of the ad management system. Members may in step 563 search the forums or message boards for advertisement, product, or service information and view the results to quickly get access to the information most important to them.

Typically, a member will start the forum or message board component 550 to access the forum or message board module 550 of the ad management system and browse available message boards and forums 553 for a message board or forum for which the member has an interest. Members may then create a new forum or message board in 552, post a new message to an existing message board or forum in step 562, reply to a message post by another member of a message board or forum in step 546, or just view message postings of other members in step 544.

Another implementation of the ad management system Community Features 500 is a News and Announcement Area 582 where new product, service, advertisement, and related information is posted for all members to view in the ad management system. The ad management system may customize different views of the news and announcements content 541 shown to unique members based upon information in the members' profile 295, product preferences or other criteria. Postings could include upcoming product promotions, new product information, or other relevant information that may be of interest to the member. Members may also be invited to post new news and announcements as seen in step 542.

Another Community Feature implementation of the ad management system is polling. Members can participate in polls by viewing a list of available polls in step 580 and choosing a poll to participate in as shown in step 582. The member can then take the poll as shown in step 585. Polls inside the Community Features 500 may cover a variety of products, services, or advertisement content including product and advertisement ratings and new product ideas. Polls 585 that are available to a particular member may depend on a member's profile 295 and preferences.

The ad management system contains within the Community Features 500, an implementation that comprises a ranking of video advertisement and promotion content stored on the ad management system.

A video listing 591 of the highest member ranked videos are available to the member and may be categorized by content type. Once a video is selected from the list 591 by the member in step 592, the member may view, interact, and rate the selected content.

Figure 6:
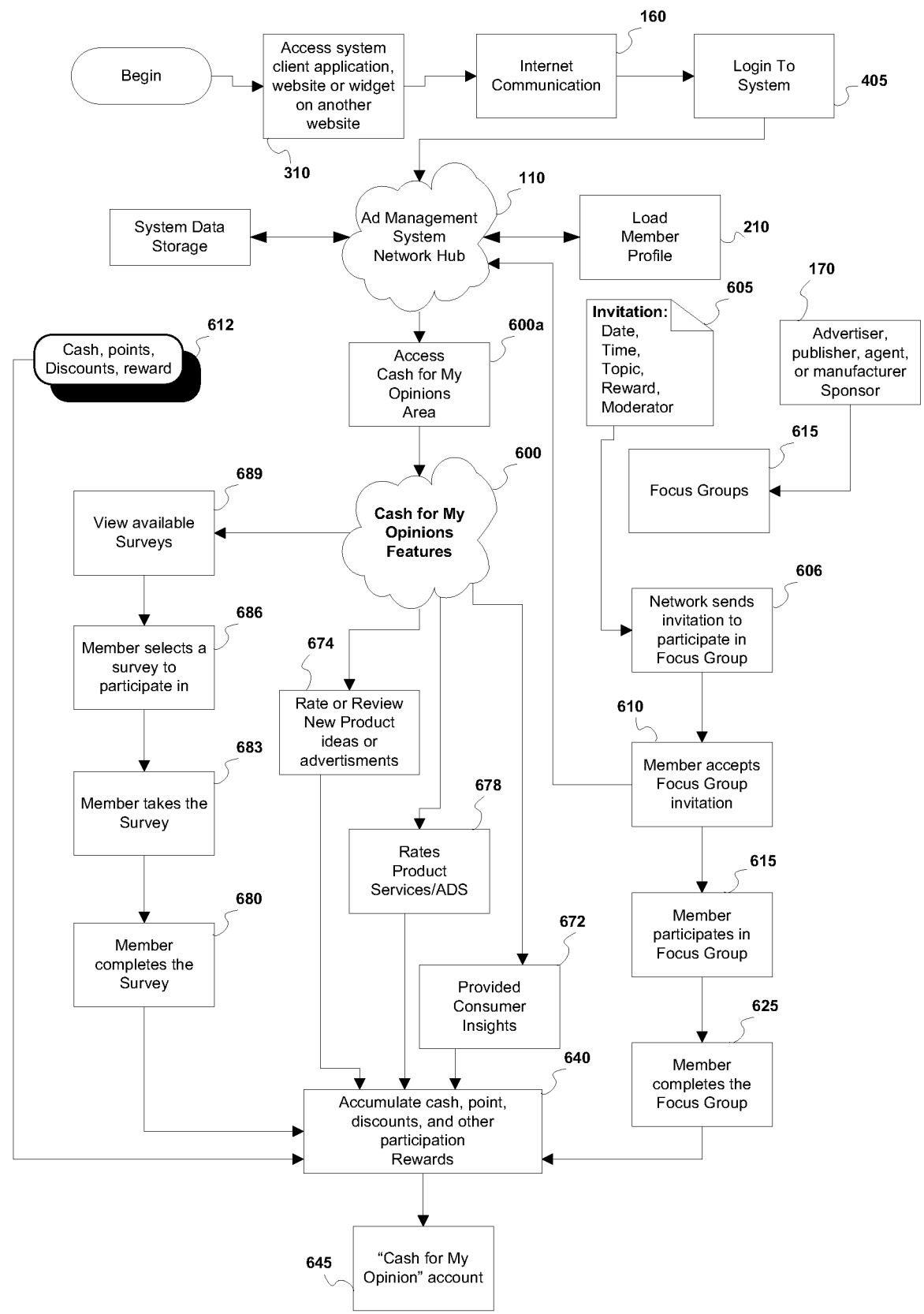
FIG. 6 illustrates aspects of My Cash for Opinions, such as Focus Groups, Polls, and Surveys.

FIG. 6 illustrates aspects of My Cash for Opinions, such as Focus Groups, Polls, and Surveys. In another implementation of the ad management system, there exists a unique user interface that supports a set of features called "Cash for My Opinions" 600. This feature area contains paid activities that members of the ad management system can use to earn rewards from participation in consumer research tools such as sponsored surveys 689 and focus groups 615.

These consumer research data gathering activities which are usually sponsored by advertisers, manufacturers, or advertising or promotional content 120 distributors 170, are intended to collect, sample, or otherwise ascertain the attitudes of members regarding a particular advertisement, product, brand, or service. Participation in consumer research activities for members is based closely on matching selection criteria between member demographic and preference information, available as part of a members profile 210, with the demographic and preference information requested by a particular survey or focus group sponsor 170. For example, members identified by their profile 295 as being in the 20 to 30 year old age demographic, may be asked to participate in a focus group 615, survey, or other opinion research activity, within the network hub 110, for a sponsor 170 that is attempting to collect data related to the consumer habits of this demographic audience.

Members must have designated their desire to participate or opt-in in to the various implementations of the "Cash for My Opinions" area 600 as shown in FIG. 2 step 290, either at time of membership signup or by changing their existing profile 295 after initial signup, before they are eligible for participation. For members to be included in the "Cash for My Opinions" area 600 activities, members of the ad management system must also have created and/or updated their member profiles 295 to contain demographic and preference information. This information will be used by the ad management system to appropriately select members of the ad management system to participate in a paid activity, whose demographics and preferences properly match that of the paid activity sponsor 170. Members may be awarded incentives 612 such as cash, points, discount coupons, or other promotional items 612 for participation in a survey 689 or focus group 615. These rewards 612 are held in the network hub 110 and are added to a members "My Opinion Credit" balance account 645, which accumulates member rewards 612 until such time that a member uses the various "My Opinion" credits, points or other awards 612 of the implementation. If cash balance amounts are accumulated, the ad management system may send a check, at the member's request or automatically, to the member once the cash balance is of a sufficient amount to warrant a check to be mailed to the member by the ad management system. Accumulated credits, cash, or other rewards 612 earned by a member may be redeemed to purchase products or services. If the member's earned cash balance is sufficient, based upon a threshold of the ad management system, the ad management system may send rewards to the member at the member's request for participation in "Cash for My Opinion" features.

In one implementation of the ad management system, which resides in the "Cash for My Opinion" 600 features, members may elect to participate in paid surveys. Participating members may visit the "Cash for My Opinion" area 600 to view all available surveys in step 689. The lists of surveys available for a particular member have been customized based upon the members unique profile information. Member may select a survey on the list in step 686 and begin taking the survey. After completing the survey in step 680, as defined by the survey sponsor, the member's credits, cash, and/or other rewards 612 earned will be deposited in the members "My Opinion" 645 account in step 640. Members may view their "My Opinion" account balances at anytime from the "Cash for My Opinions" area 600" area in step 645 by visiting the "My Opinion" 645 account link.

In another implementation of the ad management system, which resides in the "Cash for My Opinion" area 600, members may elect to participate in paid focus groups 615. Focus group sponsors might include advertisers, advertisement publishers, manufacturers, or advertising distributors 170. The ad management system may send an invitation 605 to a member to participate in focus group in step 606. A focus group invitation 605 may include information such as the topic or subject of the focus group, the moderator of the focus group, and the date and time that the focus group will occur. Members must acknowledge receipt and acceptance of the invitation 605 in step 610, as well as the member must be present and logged into the ad management system at the date and time the focus group is to be begin to be considered having participated in step 615 in a focus group. Members can elect to reject an invitation, once it is received from the ad management system if they would not like to participate in the activity. A limited number of members are invited in step 606 to participate in each focus group 615, and those members have profiles matching the demographic requirements of the focus group. An implementation of the ad management system allows advertisers, manufacturers, and other focus group sponsors 170 to monitor and observe the focus groups in real-time. This has the added advantage for the sponsor of capturing real-time information from participants of the focus group without waiting for the full analytical results from the ad management system. Member's participation in any of the consumer research activities found in the 'Cash for My Opinions" 600 area is optional. Members may designate within their member profile whether they would prefer to participate in one or many paid activities. After completing the focus group in step 625, as defined by the survey sponsor, the member's credits, cash, and/or other rewards 612 earned will be deposited in the members "My Opinion" 645 account in step 640. Members may view their "Cash for My Opinion" account balances at anytime from the "Cash for My Opinions" feature 600 area in step 645 by visiting the "Cash for My Opinion" 645 account link.

According to an implementation of the ad management system, participating members who visit the "Cash for My Opinion" area may also take part in other promotional and incentive based activities either through an "invite to participate" or by selecting an available activity without prior notification by visiting the "Cash for My Opinions" area 600 to view any currently available activities for which they may be eligible to participate based upon their member profile and demographic information. Examples of other consumer research tools, promotions, or incentives could be activities surrounding new product ideas in block 674 or consumer insights and attitudes in block 678.

Figure 7:
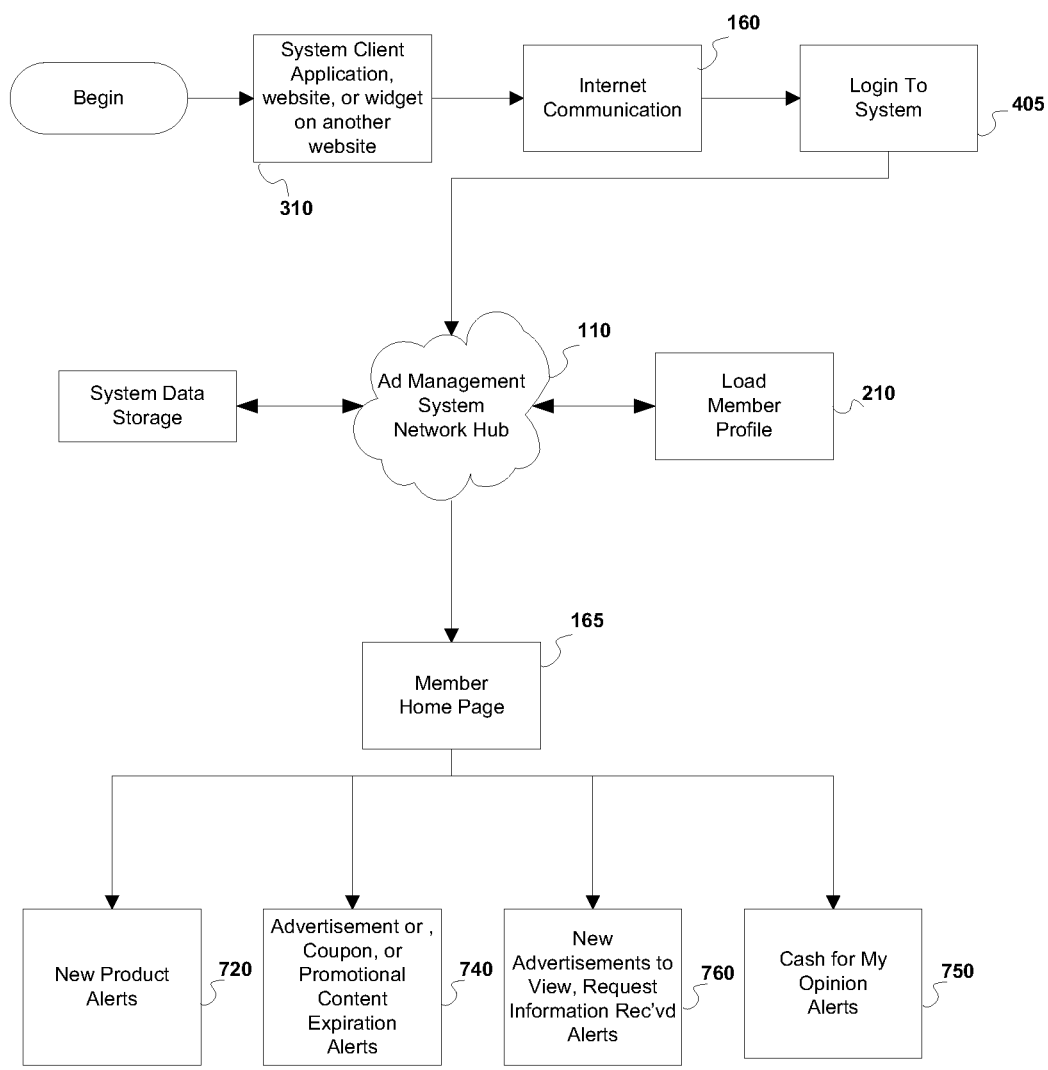
FIG. 7 is a block diagram of the Member Alert features for notifying members of important information.

FIG. 7 is a block diagram of the Member Alert features for notifying members of important information. An implementation of the ad management system provides a user interface to alert members when requested information has been received 760 and is available for viewing. This includes coupons and other advertisement or promotional content 120 expiration dates 740, special promotions or other time sensitive information associated with a particular advertisement or promotional content 120.

Members are also alerted when a new product or service announcement is made for a product or service 720 for which the member has opted to be notified.

When an invitation is received by a member to request their participation in a "Cash for My Opinions" activity 750 an alert is posted. New alerts are presented to the member at each logon to the ad management system or in real-time if the member is logged on to the system at the time of the receipt of the information. Alerts are also accessible inside the ad management system on a members landing page or homepage.

Figure 8:
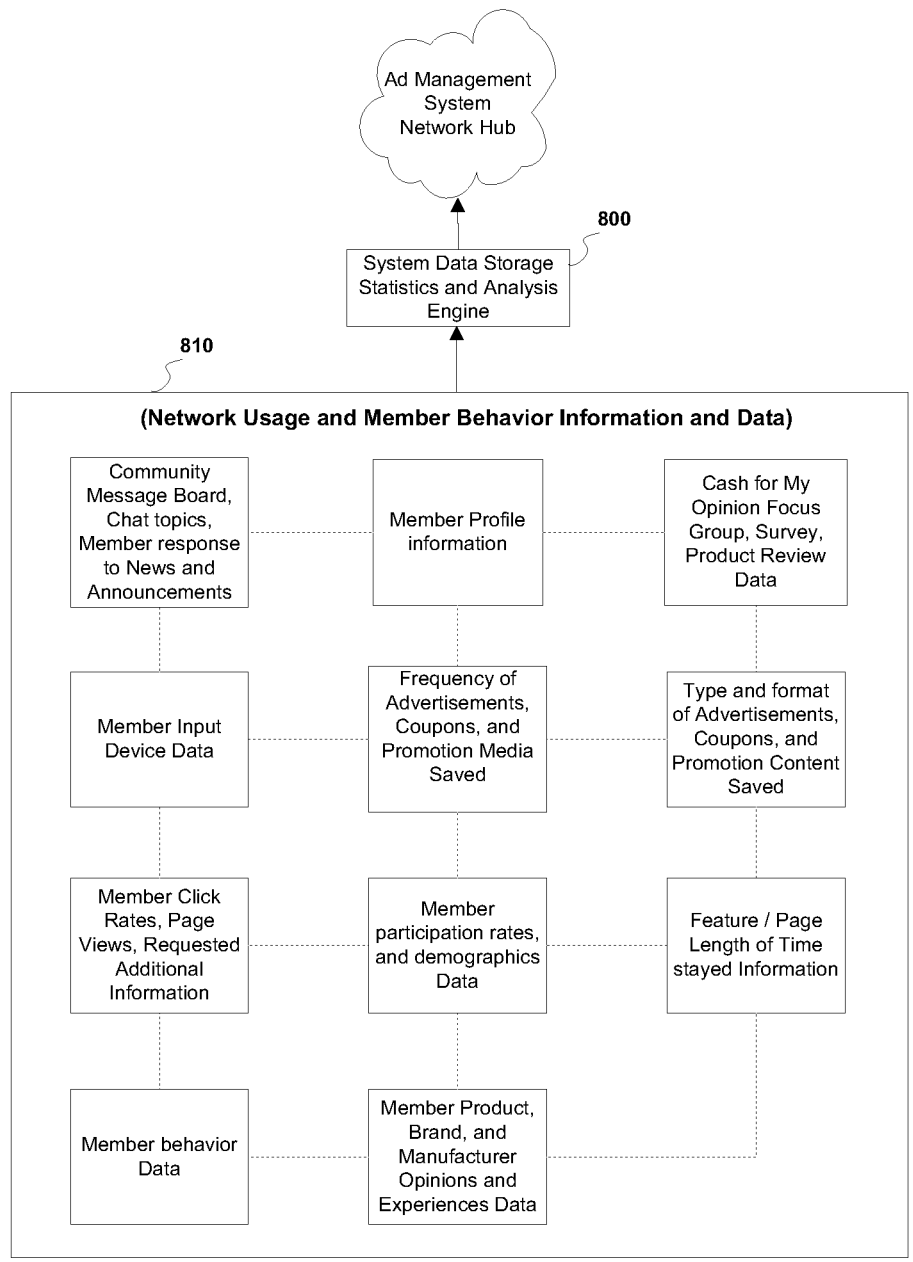
FIG. 8 is a block diagram showing several types of Member Analytical Information that may be collected and captured.

FIG. 8 is a block diagram showing several types of Member Analytical Information that may be collected and captured. Implementation of the ad management system is an analytics engine and controller 800. The analytic engine 800 is responsible of keeping metrics and other measurable information 810 about the activities and interactions of the members, Community Features 500, and usage of the ad management system. In the various implementations of the analytics engine 800, information is collected regarding the types and formats of advertisement and promotion content being stored. Also captured is the click through rates and type of additional information requested by members. An implementation of the ad management system, is an analytics engine 800 used the monitor, assemble, and harvest web metrics information such as page views, and time spent in different areas of the ad management system, including member home page or "ad space", "Cash for My Opinions" 600 and Community Area 500. If members opt-in to allow the network hub 110 to perform metrics on their preferences and profiles for the purpose of improving, enhancing, and optimizing the features and user interface implementation of the ad management system. The analytics engine 800 will capture information from opinions and views shared on the community message boards or forums 562 by members, the topics or subjects of the members created message boards 562, member's response to community news 582 and announcement postings. Analytics and metrics are assembled from the forums or message boards 562, including member preferences for brands, manufacturers, products, and services.

An implementation of the ad management system analytics engine 800 is used to collect analytics and member response data to new and existing product news and announcements with in the community area.

In another implementation of the ad management system, as part of the analytics engine 800, statistical information is gathered from members' participation in the different consumer research tools and activities that available in the "Cash for My Opinion" area 600. By analyzing the member participation and behaviors in paid research activities, for example, surveys, focus groups, and new product reviews, the network hub 110 can collect data with respect to the effectiveness of coupons, advertisements, and other promotional contents 120.

Member privacy and identity protection is a primary component in all implementations of the ad management system. In accordance with implementations of the ad management system, a unique "browsing id" is created for each member when membership is established and associated with the unique member name of the member. Any communication, such as searching outside of the network, and browsing or interacting with an advertisement or promotional content 120 will use the above-identified "browsing id" for member identification. According to implementations of the ad management system, members may request additional information from advertisers, manufacturers, publishers or distributors 170 of the advertisement or promotional content 120. For each member request, the network hub 110 will create a unique request id that uniquely identifies the request to both the sender and receiver of the request. This completely shields the member's personal information, including member name, from unwanted visibility or exposure, when using implementations of the ad management system that are external to the network hub 110. Internal communication may use both the member name and "browsing id" to identify the member. External communication that is made on behalf of the member will use this unique "browsing id" as the only member identification data exposed externally to the intended destination of an advertisement or promotional content 120, allowing the member to interact or browse with a web site destination in complete privacy.

Figure 9:
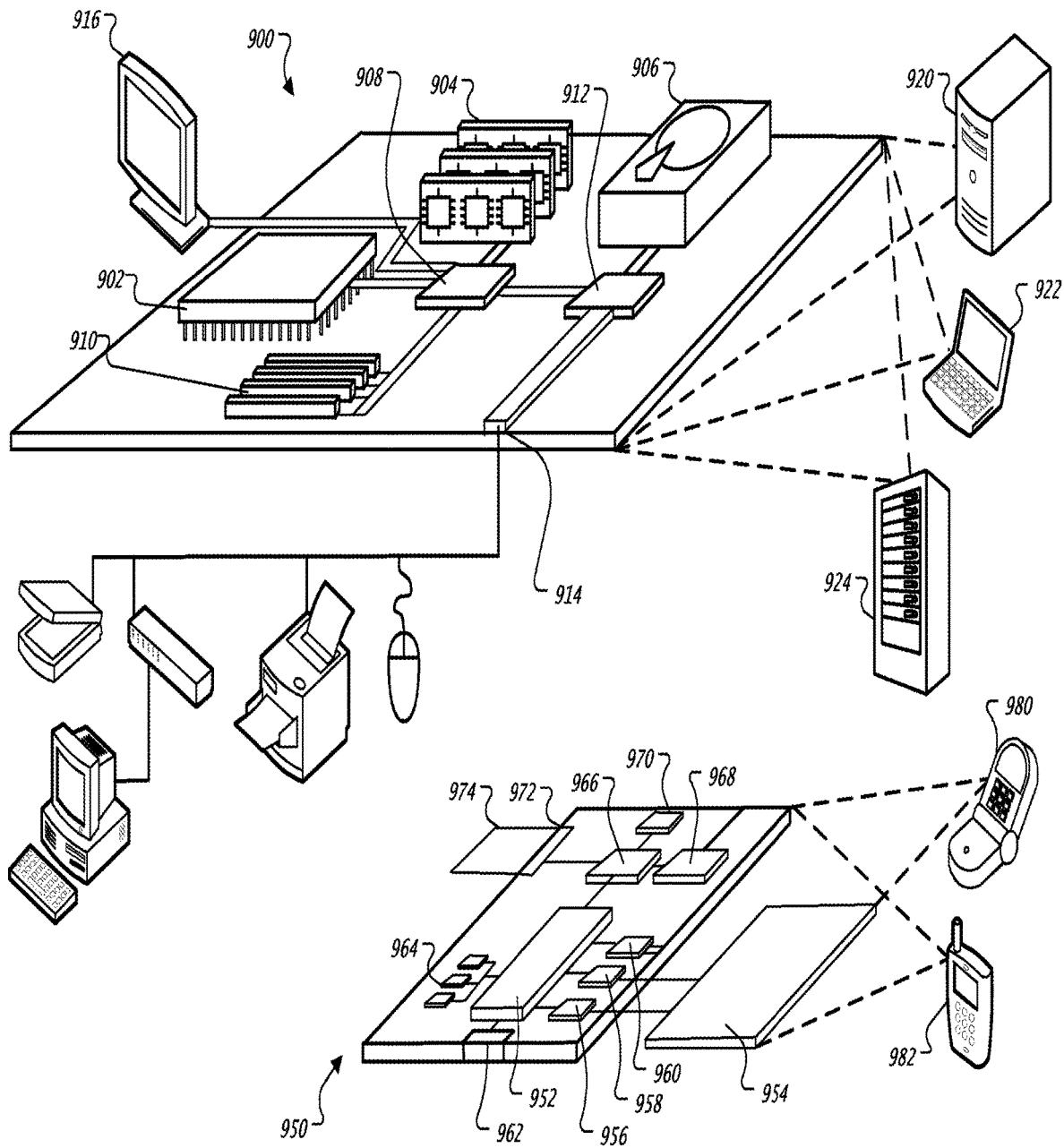
FIG. 9 is a block diagram of computing devices that may be used to implement the systems and methods described in this document.

Various implementations of the browser plug-in and ad management system may include one or more of the following:

Browser plug-in that saves text, audio, banner, and video Internet ads and promotional content Visitor Landing Page Members Home Page Ability to save all tagged types of advertisement and promotional information via all platforms connected to Internet Ability to store advertising and promotion files or text in storage data base that are timed stamped Customized Information as soon as ad is saved user will automatically receive added value currency i.e. coupons, product reviews, price comparisons and discounts to review, use and share Serving to users all advertising and promotional files saved and the customized added value information i.e. digital and printable coupon in their personal storage data base by using all Internet enabled devices Review graphically all saved and stored advertisements and promotional files and all user generated customized files and added value currency by using all Internet enabled devices Retrieving graphically all saved and stored advertisements and promotional files and all user customized files and added value currency benefits by using all Internet enabled devices Sharing confidential information with friends, peers and family Community message board or forums and chat sharing function Cash for Users Opinions in consumer research activities Search inside and outside website for advertisement and product information anonymously Alerts are e-mailed to users when new requested information arrives or reminder of Ads Saved or research activities that are time sensitive Site Analytics capable of tracking and reporting every click, link and page rendering performed in any area of the system Security Functionality in which user is in control of whom, when, and where anyone accesses the system Privacy Functionality in which the user maintains control FIG. 9 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the subject matter described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 909, 906, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a computer-readable medium. In one implementation, the memory 904 is a volatile memory unit or units. In another implementation, the memory 904 is a non-volatile memory unit or units.

The storage device 906 is capable of providing mass storage for the computing device 900. In one implementation, the storage device 906 is a computer-readable medium. In various different implementations, the storage device 906 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 904, the storage device 906, or a memory on processor 902.

The high speed controller 908 manages bandwidth-intensive operations for the computing device 900, while the low speed controller 912 manages lower bandwidth-intensive operations. Such allocation of duties is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can process instructions for execution within the computing device 950, including instructions stored in the memory 964. The processor may also include separate analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD display or an OLED display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication (e.g., via a docking procedure) or for wireless communication (e.g., via Bluetooth or other such technologies).

The memory 964 stores information within the computing device 950. In one implementation, the memory 964 is a computer-readable medium. In one implementation, the memory 964 is a volatile memory unit or units. In another implementation, the memory 964 is a non-volatile memory unit or units. Expansion memory 974 may also be provided and connected to device 950 through expansion interface 972, which may include, for example, a SIMM card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS receiver module 970 may provide additional wireless data to device 950, which may be used as appropriate by applications running on device 950.

Device 950 may also communication audibly using audio codec 960, which may receive spoken information from a user and convert it to usable digital information. Audio codex 960 may likewise generate audible sound for a user, such as through a speaker, e.g., in a handset of device 950.

Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the subject matter described herein. For example, various forms of the flows shown above may be used, with steps re-ordered, added, or removed. Also, although several applications of the systems and methods have been described, it should be recognized that numerous other applications are contemplated. Accordingly, other implementations are within the scope of the following claims.

What is claimed is:

1. A computer-implemented method, comprising:

receiving, by a management system, from a computing device, a first communications message associated with a user account, the first communication message indicating a request to store a content item from within a web page of a third party, the web page rendered in a web browser software of the computing device, the request made by a plug-in component of the web browser software in response to a user selecting a graphical user interface (GUI) icon generated by the plug-in component and rendered by the web browser software as an overlay on the content item in the web page, the request including an indication of the content item, the plug-in component installed on the web browser software of the computing device, wherein the plug-in component generates the GUI icon for rendering by the web browser software in response to detecting the content item on the web page of the third party;

storing the content item with a unique identifier in a computing storage of the management system, the unique identifier substituted for an identifier associated with the content on the web page, the unique identifier preventing subsequent tracking of the content by the web page;

retrieving additional information regarding the content item from a server associated with the third party;

storing in the computing storage the associated additional information regarding the content item with the content item;

transmitting, using secure communications, a member page including the content item and the associated additional information to the web browser software of the computing device for rendering by the web browser software for the user, the member page including a sharing GUI element to enable sharing of the content item with a target user of the management system;

receiving a second communications message from the web browser software of the computing device to share the content item with the target user;

receiving a third communications message from a target web browser software of a target computing device associated with the target user, the third communications message indicating a request for a home page of the target user; and transmitting, using secure communications, the home page including the content item and the additional information to the target web browser of the target computing device for rendering by the target web browser, the content item identified using the unique identifier in the home page, the content item transmitted to the web browser of the target computing device from the storage unit of the management system.

2. The method of claim 1, further comprising:
receiving a request from the target web browser software with a search query for a message board, the message board stored in the computing storage and including stored content items; and
transmitting a response to the target web browser software, the response including a list of search results, the list of search results including content items matching the search query.

3. The method of claim 1, further comprising:
transmitting a notification to the target web browser software, the notification indicating a personalized content item.

4. The method of claim 1, further comprising:
transmitting one or more additional content items to the target web browser software, the one or more additional content items each having at least one characteristic matching a corresponding characteristic of the content item.

5. The method of claim 1, further comprising:
receiving a message from the target web browser software indicating a rank value for a content item; and
storing an association between the rank value and the content item in a user account of the target user in the computing storage.

6. The method of claim 1, further comprising:
receiving a message from the target web browser software indicating a group for the content item; and
storing an association between the group and the content item in a user account of the target user in the computing storage.

7. The method of claim 1, further comprising:
receiving a message from the target web browser software having text notes for the content item; and
storing the text notes in a user account of the target user in the computing storage, the text notes associated with the content item.

8. The method of claim 1, further comprising:
receiving a request from the web browser software to restrict access to a content item to a user account associated with the target user; and
storing a restriction indication with the content item, the restriction indication indicating to the management system to restrict access to the content item only to the user account associated with the target user.

9. The method of claim 1, further comprising:
transmitting a share message to an external account associated with a user account of the target user, the share message indicating the content item; and
wherein the external account has a type that is indicated in the second communications message, the type selected from one of an email account and a social networking account.

10. A non-transitory computer readable storage medium, comprising instructions, that when executed by a processor, cause the processor to:
receive, by a management system, from a computing device, a first communications message associated with a user account, the first communication message indicating a request to store a content item from within a web page of a third party, the web page rendered in a web browser software of the computing device, the request made by a plug-in component of the web browser software in response to a user selecting a graphical user interface (GUI) icon generated by the plug-in component and rendered by the web browser software as an overlay on the content item in the web page, the request including an indication of the content item, the plug-in component installed on the web browser software of the computing device, wherein the plug-in component generates the GUI icon for rendering by the web browser software in response to detecting the content item on the web page of the third party;
store the content item with a unique identifier in a computing storage of the management system, the unique identifier substituted for an identifier associated with the content on the web page, the unique identifier preventing subsequent tracking of the content by the web page;
retrieve additional information regarding the content item from a server associated with the third party;
store in the computing storage the associated additional information regarding the content item with the content item;
transmit, using secure communications, a member page including the content item and the associated additional information to the web browser software of the computing device for rendering by the web browser software for the user, the member page including a sharing GUI element to enable sharing of the content item with a target user of the management system;
receive a second communications message from the web browser software of the computing device to share the content item with the target user;
receive a third communications message from a target web browser software of a target computing device associated with the target user, the third communications message indicating a request for a home page of the target user; and
transmit, using secure communications, the home page including the content item and the additional information to the target web browser of the target computing device for rendering by the target web browser, the content item identified using the unique identifier in the home page, the content item transmitted to the web browser of the target computing device from the storage unit of the management system.

11. The non-transitory computer readable storage medium of claim 10, comprising further instructions that when executed by the processor cause the processor to:
receive a request from the target web browser software with a search query for a message board, the message board stored in the computing storage and including stored content items; and
transmit a response to the target web browser software, the response including a list of search results, the list of search results including content items matching the search query.

12. The non-transitory computer readable storage medium of claim 10, comprising further instructions that when executed by the processor cause the processor to:
transmit a notification to the target web browser software, the notification indicating a personalized content item.

13. The non-transitory computer readable storage medium of claim 10, comprising further instructions that when executed by the processor cause the processor to:
transmit one or more additional content items to the target web browser software, the one or more additional content items each having at least one characteristic matching a corresponding characteristic of the content item.

14. The non-transitory computer readable storage medium of claim 10, comprising further instructions that when executed by the processor cause the processor to:

receive a message from the target web browser software indicating a rank value for a content item; and store an association between the rank value and the content item in a user account of the target user in the computing storage.

15. The non-transitory computer readable storage medium of claim 10, comprising further instructions that when executed by the processor cause the processor to:

receive a message from the target web browser software indicating a group for the content item; and store an association between the group and the content item in a user account of the target user in the computing storage.

16. The non-transitory computer readable storage medium of claim 10, comprising further instructions that when executed by the processor cause the processor to:

receive a message from the target web browser software having text notes for the content item; and store the text notes in a user account of the target user in the computing storage, the text notes associated with the content item.

17. The non-transitory computer readable storage medium of claim 10, comprising further instructions that when executed by the processor cause the processor to:

receive a request from the web browser software to restrict access to a content item to a user account associated with the target user; and store a restriction indication with the content item, the restriction indication indicating to the management system to restrict access to the content item only to the user account associated with the target user.

* * * * *